US012434135B2

United States Patent
Kim et al.

(10) Patent No.: US 12,434,135 B2
(45) Date of Patent: Oct. 7, 2025

(54) CONTACTLESS MOTION GAME DEVICE OR KIOSK

(71) Applicant: TOVIS CO., LTD., Incheon (KR)

(72) Inventors: Yong Beom Kim, Incheon (KR); Byung Min Yu, Seoul (KR); Sung Doug Kim, Gyeonggi-do (KR)

(73) Assignee: TOVIS CO., LTD., Incheon (KR)

( * ) Notice: Subject to any disclaimer, the term of this patent is extended or adjusted under 35 U.S.C. 154(b) by 431 days.

(21) Appl. No.: 18/010,457

(22) PCT Filed: Jun. 15, 2021

(86) PCT No.: PCT/KR2021/007487
§ 371 (c)(1),
(2) Date: Dec. 15, 2022

(87) PCT Pub. No.: WO2021/261828
PCT Pub. Date: Dec. 30, 2021

(65) Prior Publication Data
US 2023/0233927 A1 Jul. 27, 2023

(30) Foreign Application Priority Data
Jun. 23, 2020 (KR) .................. 10-2020-0076176

(51) Int. Cl.
*A63F 13/214* (2014.01)
*G06F 3/03* (2006.01)

(52) U.S. Cl.
CPC .......... *A63F 13/214* (2014.09); *G06F 3/0304* (2013.01)

(58) Field of Classification Search
CPC .............................. A63F 13/214; G06F 3/0304
(Continued)

(56) References Cited

U.S. PATENT DOCUMENTS

| 9,423,879 B2* | 8/2016 | Chen ...................... G06V 40/28 |
| 2008/0060918 A1 | 3/2008 | Chiang et al. |
| 2017/0255280 A1* | 9/2017 | Pacsai ................. G06F 3/04883 |

FOREIGN PATENT DOCUMENTS

| JP | 3-30905 | 6/1991 |
| JP | 5-108225 | 4/1993 |

(Continued)

OTHER PUBLICATIONS

International Search Report for PCT/KR2021/007487 mailed on Sep. 16, 2021 and its English Translation from WIPO (now published as WO 2021/261828).

(Continued)

*Primary Examiner* — Allen Chan
(74) *Attorney, Agent, or Firm* — Ladas & Parry, LLP

(57) ABSTRACT

Provided are a contactless motion device including a contactless motion game device or a contactless kiosk. The contactless motion device according to an exemplary embodiment includes a substrate including at least one hole, a body unit including a sensor unit, which is disposed around the hole in a plan view, and a control unit connected to the sensor unit. The sensor unit includes a first sensor, which transmits a first signal, and a second sensor, which receives the first signal, the control unit is configured to determine whether a target object is inserted in the hole, based on the first signal received by the second sensor, and the hole completely penetrates the substrate in a thickness direction.

18 Claims, 21 Drawing Sheets

(58) Field of Classification Search
USPC .......................................................... 463/37
See application file for complete search history.

(56) References Cited

FOREIGN PATENT DOCUMENTS

| JP | 6-44878 | 2/1994 |
| KR | 10-2013-0003241 | 1/2013 |
| KR | 10-2235357 | 4/2021 |

OTHER PUBLICATIONS

Written Opinion of the International Searching Authority for PCT/KR2021/007487 mailed on Sep. 16, 2021 and its English Translation by Google Translate (now published as WO 2021/261828).

* cited by examiner

SP_1: SP1, SP2, SP3, SP4

SP_1: SP1, SP2, SP3, SP4

CONTACTLESS MOTION GAME DEVICE OR KIOSK

CROSS-REFERENCE TO RELATED APPLICATIONS

This application is the national stage of International Patent Application No. PCT/KR2021/007487 filed on Jun. 15, 2021, which claims priority to Korean Patent Application No. 10-2020-0076176 filed in the Korean Intellectual Property Office on Jun. 23, 2020, the disclosures of which are incorporated by reference herein in their entireties.

TECHNICAL FIELD

The present disclosure relates to a contactless motion device, and the contactless motion device includes a contactless motion game device or a contactless kiosk.

BACKGROUND ART

A gaming machine or kiosk is operated by a user physically entering input (e.g., a touch) to an input device (e.g., a button), but when the user directly touches the input device, there may exist inconvenience. Also, when infectious viruses are prevalent, it may not be sanitary for the user to physically enter input to the input device that may leave other people's traces.

DISCLOSURE

Technical Problems

One aspect of the present invention provides a device that can be operated by non-contact input, in the field of game devices or kiosks.

Aspects of the present invention are not limited to the aspects mentioned above, and other technical aspects not mentioned above will be clearly understood by those skilled in the art from the following description.

Technical Solutions

A contactless motion device according to an exemplary embodiment for solving the above problem includes a substrate including at least one hole, a body unit including a sensor unit, which is disposed around the hole in a plan view, and a control unit connected to the sensor unit. The sensor unit includes a first sensor, which transmits a first signal, and a second sensor, which receives the first signal, the control unit is configured to determine whether a target object is inserted in the hole, based on the first signal received by the second sensor, and the hole completely penetrates the substrate in a thickness direction.

The first and second sensors may be inserted in the substrate.

The control unit may be configured to determine whether the target object is inserted in the hole, if an intensity of the first signal received by the second sensor is less than an intensity of the first signal transmitted by the first sensor by as much as a threshold value.

The control unit may be configured to determine whether the target object is inserted in the hole, if a duration for which the intensity of the first signal received by the second sensor continues to be less than the intensity of the first signal transmitted by the first sensor by as much as the threshold value is longer than a first period and a shorter than a second period.

The control unit may be configured to determine whether the target object is inserted in the hole, if an intensity of the first signal received by the second sensor is repeatedly detected at least twice as being less than an intensity of the first signal transmitted by the first sensor by as much as a threshold value.

The contactless motion device may further include an event unit connected to the control unit. The event unit may be configured to output an event, if the control unit detects whether the target object is inserted, and may include a vibration sensor or an acoustic sensor.

The sensor unit may further include third and fourth sensors. The third and fourth sensors may be configured to measure an insertion speed of the target object by measuring a distance from the target object at first and second points, respectively, of time. The second point of time may be later than the first point of time. The control unit may determine that the target object is not inserted, if the insertion speed of the target object is greater than a first speed.

The first signal may include infrared light, visible light, or ultrasound.

The contactless motion device may further include sub-units disposed in the hole to be spaced apart from each other. The first and second sensors may be mounted on the sub-units.

A plurality of holes may be provided. The first sensor may be positioned on one side of an array of the plurality of holes. The second sensor may be positioned on the other opposite side of the array of the plurality of holes.

A plurality of holes may be provided. The plurality of holes may be arranged in a first direction. The first sensor may be positioned on one side, in a second direction, which intersects the first direction, of an array of the plurality of holes. The second sensor may be positioned on the other side, in the second direction, of the array of the plurality of holes.

A contactless motion device according to an exemplary embodiment for solving the above problem includes a substrate including a plurality of sides and a groove, which is recessed from at least one of the sides, a body unit including a sensor unit, which is disposed around the groove in a plan view, a control unit connected to the sensor unit. The sensor unit includes a first sensor, which transmits a first signal, and a second sensor, which receives the first signal, and the control unit is configured to determine whether a target object is inserted in the groove, based on the first signal received by the second sensor.

The groove may completely penetrate the substrate in a thickness direction.

The first and second sensors may be inserted in the substrate.

The control unit may be configured to determine whether the target object is inserted in the groove, if an intensity of the first signal received by the second sensor is less than an intensity of the first signal transmitted by the first sensor by as much as a threshold value.

The control unit may be configured to determine whether the target object is inserted in the hole, if a duration for which the intensity of the first signal received by the second sensor continues to be less than the intensity of the first signal transmitted by the first sensor by as much as the threshold value is longer than a first period and a shorter than a second period.

The control unit may be configured to determine whether the target object is inserted in the hole, if an intensity of the first signal received by the second sensor is repeatedly detected at least twice as being less than an intensity of the first signal transmitted by the first sensor by as much as a threshold value.

The contactless motion device may further include an event unit connected to the control unit. The event unit may be configured to output an event, if the control unit detects whether the target object is inserted.

The sensor unit may further include third and fourth sensors. The third and fourth sensors may be configured to measure an insertion speed of the target object by measuring a distance from the target object at first and second points, respectively, of time. The second point of time may be later than the first point of time. The control unit may determine that the target object is not inserted, if the insertion speed of the target object is greater than a first speed.

The contactless motion device may further include sub-units disposed in the hole to be spaced apart from each other. The first and second sensors may be mounted on the sub-units.

Advantageous Effects

According to exemplary embodiments of the present disclosure, a contactless motion device can be operated by non-contact input. Thus, inconvenience that may arise when a user physically touches an input device can be reduced, and as the user does not need to physically enter input to the input device where other people's traces may remain, personal hygiene can be improved.

Effects according to exemplary embodiments are not limited by the contents exemplified above, and more various effects are included in the present specification.

BEST MODES FOR CARRYING OUT THE INVENTION

Figure 1:
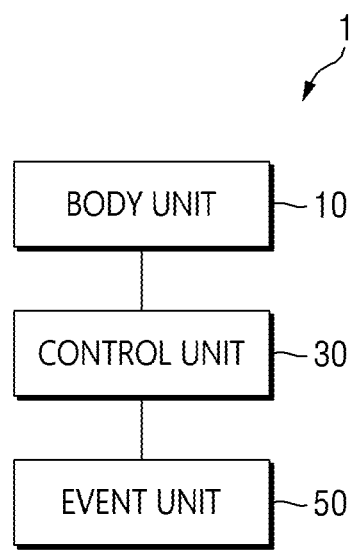
FIG. 1 is a block diagram of a contactless motion device according to an embodiment of the present disclosure.

Advantages and features of the present invention, and methods of achieving the same will be clearly understood with reference to the accompanying drawings and the following detailed embodiments. However, the present invention is not limited to the exemplary embodiments to be disclosed, but may be implemented in various different forms. The exemplary embodiments are provided in order to fully explain the present invention and fully explain the scope of the present invention for those skilled in the art. The scope of the present invention is defined by the appended claims.

Referring that an element or layer is "on" of another element or layer includes all cases in which another layer or element is interposed directly on or in the middle of another element. Like reference numerals refer to like elements throughout the specification.

Although the terms "first," "second," etc. are used to describe various elements, these elements are not limited by these terms. These terms are only used to distinguish one element from another element. Therefore, of course the first element mentioned below may be the second element within the technological scope of the present invention.

Hereinafter, specific exemplary embodiments will be described with reference to the accompanying drawings.

FIG. 1 is a block diagram of a contactless motion device according to an embodiment of the present disclosure.

Referring to FIG. 1, a contactless motion device 1 may be operated by non-contact input. Examples of the contactless motion device 1 include a contactless game device and a contactless kiosk, but the present disclosure is not limited thereto.

The contactless motion device 1 may include a body unit 10, a control unit 30, and an event unit 50. The body unit 10 may include a substrate ("SUB" of FIG. 2) and a sensor unit ("SP" of FIG. 2). The substrate SUB may include at least one hole ("H" of FIG. 2). The hole H may provide an area in which a target object can be inserted.

The control unit 30 may transmit signals to, or receive signals from, the hole H to determine whether the target object is inserted. This will be described later in detail.

The event unit 50 may output an event if a determination is made by the control unit that the target object is inserted. The event unit 50 will be described later in detail.

Figure 2:
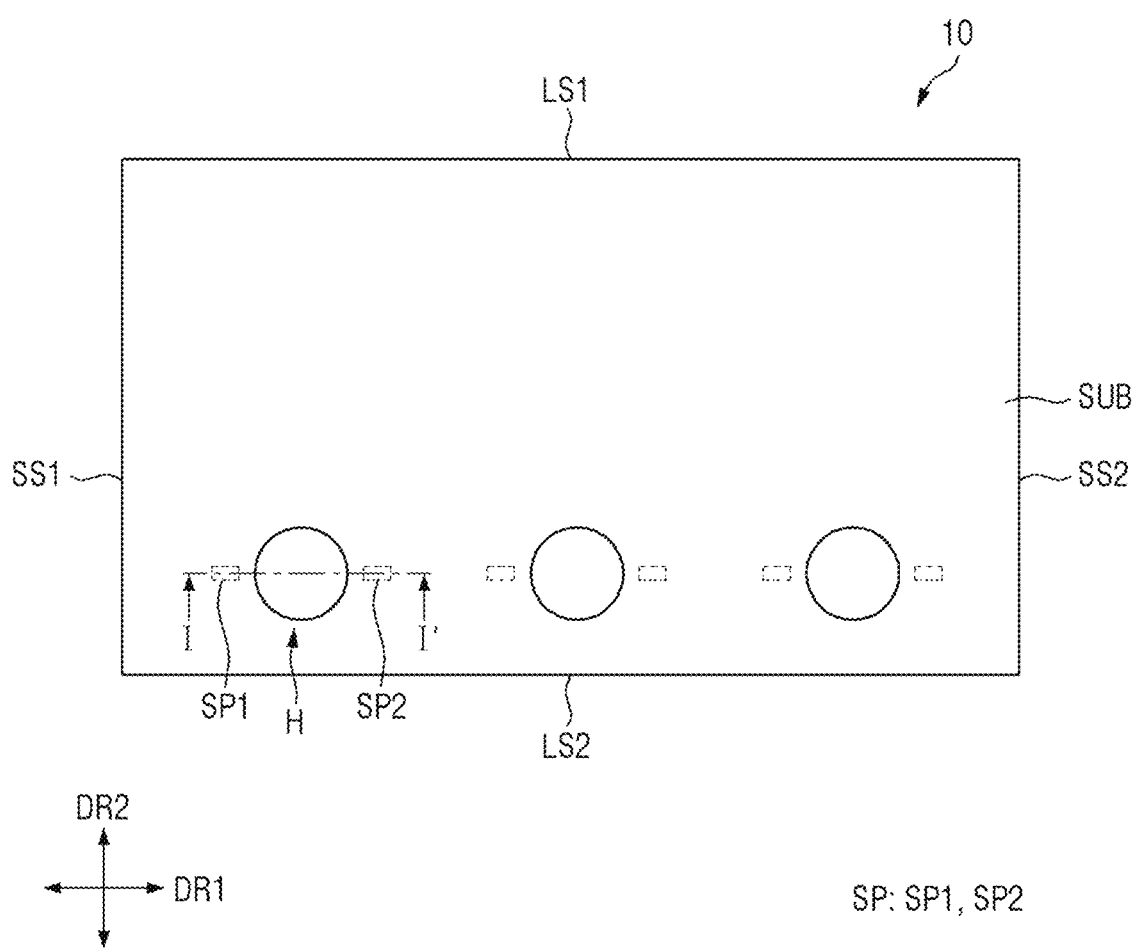
FIG. 2 is a plan view of the contactless motion device according to an embodiment of the present disclosure.
Figure 3:
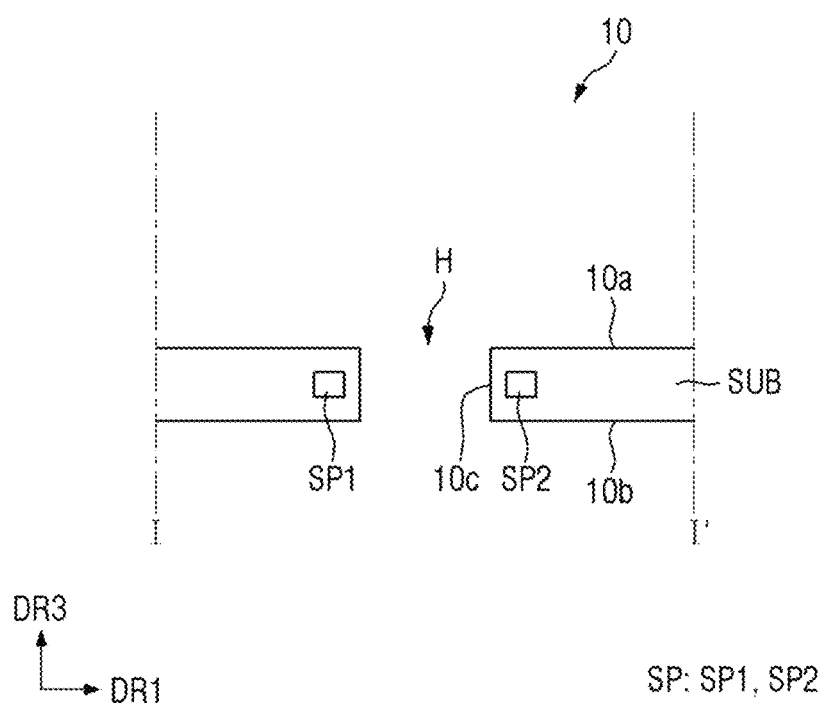
FIG. 3 is a cross-sectional view taken along line I-I' of FIG. 2.

FIG. 2 is a plan view of the contactless motion device according to an embodiment of the present disclosure. FIG. 3 is a cross-sectional view taken along line I-I' of FIG. 2.

Referring to FIG. 2, the body unit 10 may generally have a rectangular planar shape. In a case where the body unit 10 has a rectangular planar shape, the planar shape of the body unit may include long sides (LS1 and LS2), which extend in a first direction DR1, and short sides (SS1 and SS2), which extend in a second direction DR2 intersecting the first direction DR1. However, the present disclosure is not limited to this. Alternatively, the body unit 10 may have various other planar shapes such as a circular shape, an elliptical shape, a square shape, or another polygonal shape. The body unit 10 may include a top surface 10a, a bottom surface 10b, which is opposite to the top surface 10a, and a side surface 10c, which is exposed by the hole H that will be described, and is connected to the top surface 10a and the bottom surface 10b.

The substrate SUB may include a rigid material. For example, the rigid material of the substrate SUB may include glass or quartz, but the present disclosure is not limited thereto. The substrate SUB may include various other materials.

The hole H may be surrounded by the long sides and the short sides of the substrate SUB. In a plan view, the hole H may be positioned in the substrate SUB.

More than one hole H may be provided, but the present disclosure is not limited thereto. Alternatively, only one hole H may be provided.

As illustrated in FIG. 2, more than one hole H may be arranged in the first direction DR1.

As illustrated in FIG. 3, the hole H may completely penetrate the substrate SUB in a thickness direction.

The hole H may have a circular planar shape, but the present disclosure is not limited thereto. Alternatively, the hole H may have various other planar shapes such as an elliptical shape, a rectangular shape, a triangular shape, or another polygonal shape.

The sensor unit SP may be positioned around the hole H in a plan view.

The sensor unit SP may be positioned in the substrate SUB (or inserted in the substrate SUB).

The sensor unit SP may include at least one first sensor SP1, which receives a first signal, and at least one second sensor SP2, which receives the first signal. FIG. 2 illustrates that in a plan view, the first sensor SP1 is positioned on one side, in the first direction DR1, of the hole H and the second sensor SP2 is positioned on the other side, in the first direction DR1, of the hole H. However, the position of the sensor unit SP is not particularly limited.

The first signal may include infrared light, visible light, ultraviolet light, or ultrasound, but the type of the first signal is not particularly limited as long as the first signal can be transmitted or received.

Figure 4:
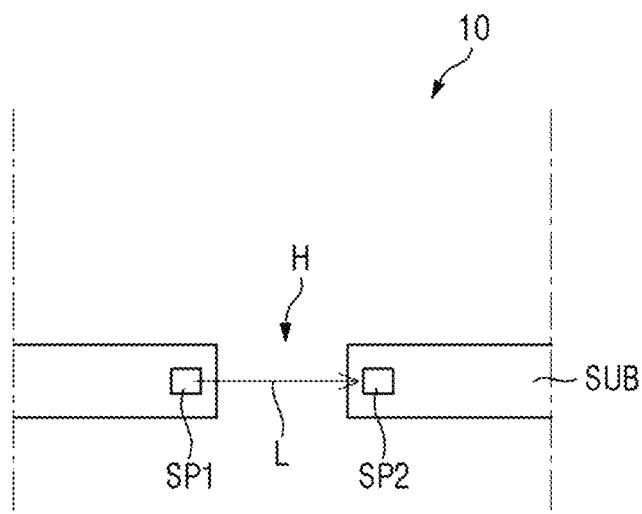
FIGS. 4 and 5 are schematic views illustrating the operation of the contactless motion device according to an embodiment of the present disclosure.
Figure 5:
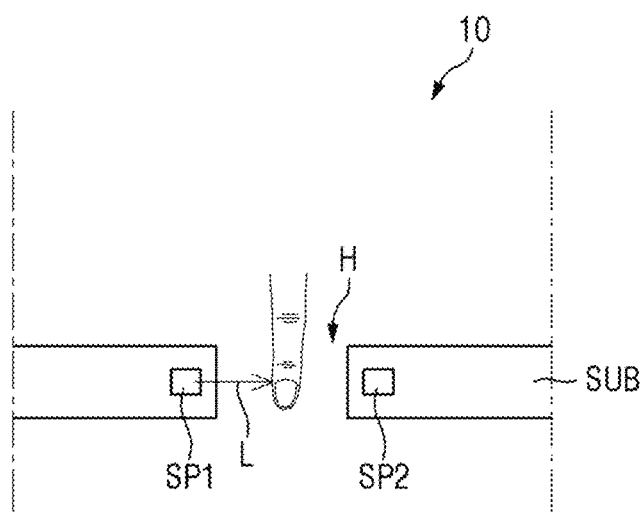

FIGS. 4 and 5 are schematic views illustrating the operation of the contactless motion device according to an embodiment of the present disclosure.

Referring to FIGS. 4 and 5, a first sensor SP1 may transmit a first signal L, and a second sensor SP2 may receive the first signal L transmitted by the first sensor SP1. As already mentioned above, the first signal L may include infrared light, visible light, ultraviolet light, or ultrasound.

The first signal L may be transmitted, for example, in a direction toward the second sensor SP2. The direction in which the first signal L is transmitted may be a direction from the first sensor SP1 to the second sensor SP2.

Meanwhile, as illustrated in FIG. 5, if a target object is inserted in a hole H, part of the first signal L transmitted by the first sensor SP1 may be blocked by the target object and may thus not be able to be received by the second sensor SP2, and another part of the first signal L may not be completely blocked and may thus be able to be received by the second sensor SP2. As will be described later, the control unit ("30" of FIG. 1) may determine whether the target object is inserted, by comparing the intensity of the first signal L transmitted by the first sensor SP1 and the intensity of the first signal L received by the second signal SP2.

The operations of the body unit 10, the control unit 30, and the event unit 50 will hereinafter be described.

Figure 6:
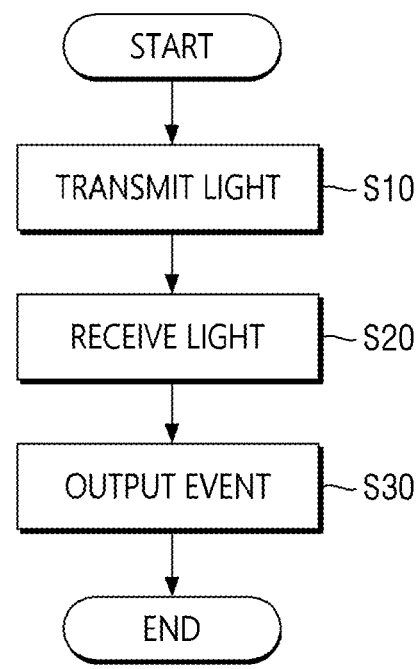
FIG. 6 is a flowchart illustrating an operating method using the contactless motion device according to an embodiment of the present disclosure.
Figure 7:
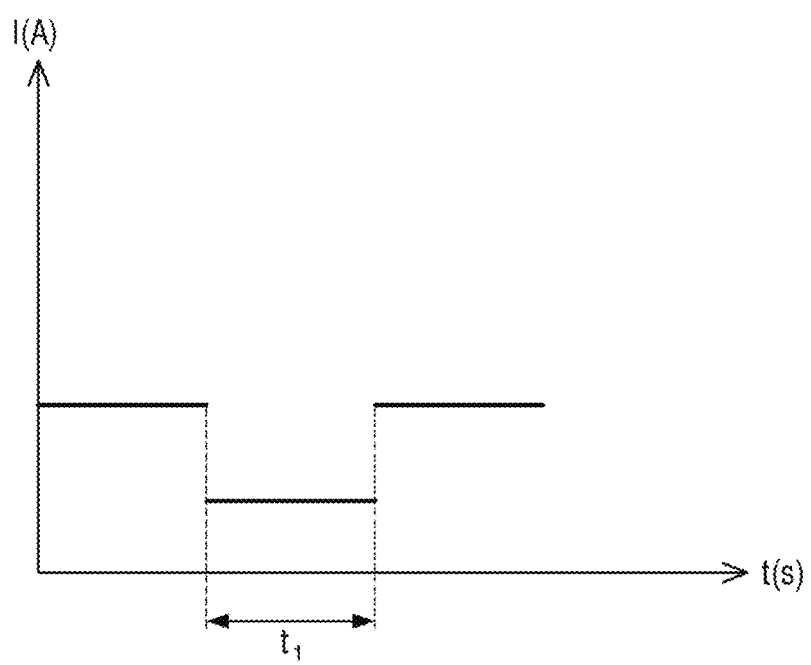
FIGS. 7 through 9 are graphs showing a first signal received in accordance with the operating method according to an embodiment of the present disclosure.
Figure 8:
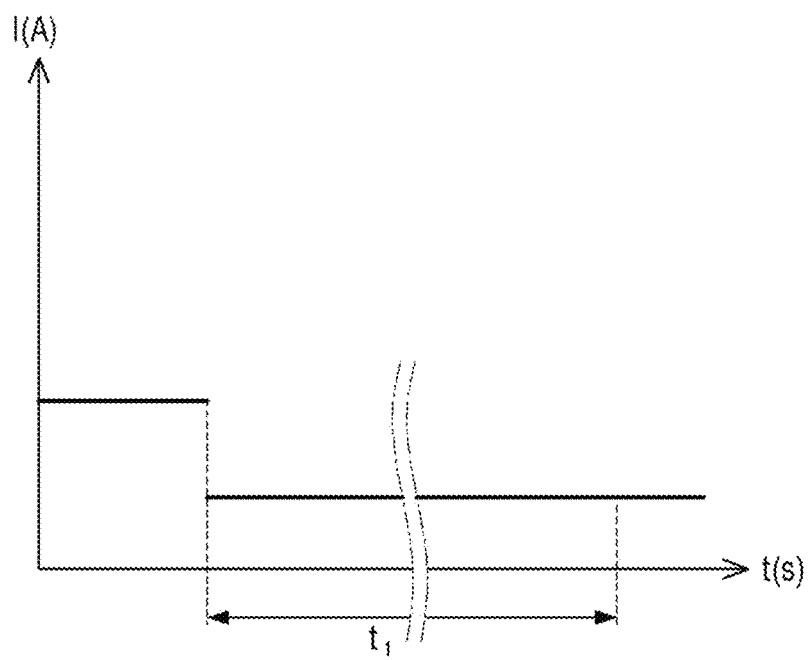
Figure 9:
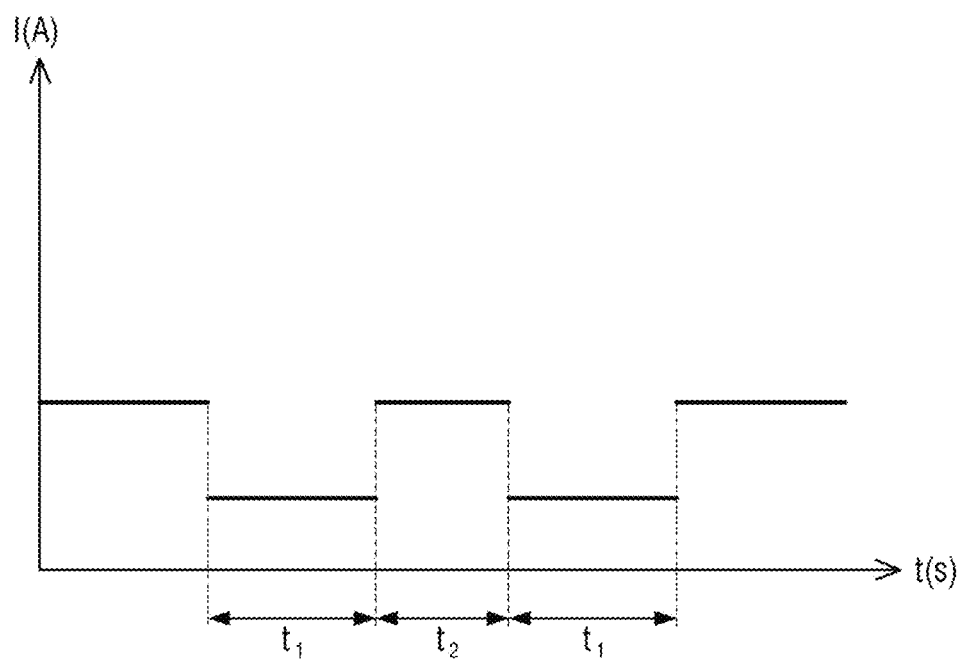

FIG. 6 is a flowchart illustrating an operating method using the contactless motion device according to an embodiment of the present disclosure. FIGS. 7 through 9 are graphs showing a first signal received in accordance with the operating method according to an embodiment of the present disclosure. Referring to FIGS. 7 through 9, a horizontal axis indicates an operating time t(s) of the contactless motion device according to an embodiment of the present disclosure, and a vertical axis indicates an intensity I(A) of a first signal L received by a second sensor SP2.

Referring to FIGS. 1 through 5 and 6, the first signal L is transmitted by the first sensor SP1 (S10). FIG. 6 illustrates light as an exemplary first signal L. The second sensor SP2 receives the first signal L transmitted by the first sensor SP1 (S20). During the transmission of the first signal L between the first and second sensors SP1 and SP2, the target object may be inserted in the hole H.

FIG. 7 shows a case where the target object is originally not inserted in the hole H and is then inserted in, and ejected from, the hole H.

When the target object is not inserted in the hole H, the first signal L received by the second sensor SP2 may have, for example, a first intensity, and when the target object is inserted in the hole H (for as long as a first period t1 of FIG. 7), the first signal L received by the second sensor SP2 may have, for example, a second intensity.

In a contactless operating method using the contactless motion device 1, if the second intensity is less than the first intensity by as much as a predetermined value, the control unit 30 may determine that the target object is inserted in the hole H. The second intensity may be less than the first intensity. For example, in the contactless operating method using the contactless motion device 1, if the second intensity is less than the first intensity by as much as a threshold value, the control unit 30 may determine that the target object is inserted in the hole H. On the contrary, in the contactless operating method using the contactless motion device 1, if the second intensity is greater than the first intensity by as much as the threshold value, the control unit 30 may determine that the target object is not inserted in the hole H. The threshold value may be, for example, 50% or 40%, but the present disclosure is not limited thereto. That is, the threshold value may vary depending on the design of the control unit 30 or necessity.

Also, in the contactless operating method using the contactless motion device 1, if the first period t1 is more than "a" hours and less than "b" hours, the control unit 30 may determine whether the target object is inserted. In other words, if the first period t1 is less than "a" hours or more than "b" hours, the control unit 30 may determine that the target object is not inserted in the hole H.

In the contactless operating method using the contactless motion device 1, the control unit 30 may determine that the target object is inserted, if the first period t1 is more than "a" hours and less than "b" hours, and determine that the target object is not inserted in the hole H, if the first period t1 is less than "a" hours or more than "b" hours. Accordingly, the control unit may be able not to consider input made by an unintentional action of holding the target object in the hole H as an insertion of the target object. Accordingly, the detection of an insertion of the target object by the control unit 30 can be accurately performed.

In some embodiments, as illustrated in FIGS. 4, 5, and 9, in the contactless operating method using the contactless motion device 1, the control unit 30 may be configured to determine whether the target object is inserted, if the intensity of the first signal L received by the second sensor SP2 is repeatedly detected at least twice as being less than the intensity of the first signal L transmitted by the first sensor SP1 by as much as the threshold value.

Specifically, if the intensity of the first signal L received by the second sensor SP2 is less than the intensity of the first signal L transmitted by the first sensor SP1 by as much as the threshold value and at least two first periods t1 of more than "a" hours and less than "b" hours appear repeatedly, the control unit 30 may be configured to determine whether the target object is inserted. A second period t2 may exist between the two first periods t1.

In the contactless operating method using the contactless motion device 1, if the intensity of the first signal L received by the second sensor SP2 is repeatedly detected at least twice as being less than the intensity of the first signal L transmitted by the first sensor SP1 by as much as the threshold value, the control unit 30 may determine whether the target object is inserted, and the detection of an insertion of the target object by the control unit 30 can be accurately performed.

Display devices according to other embodiments of the present disclosure will hereinafter be described. Like reference numerals indicate like elements, and thus, descriptions thereof will be omitted or simplified.

Figure 10:
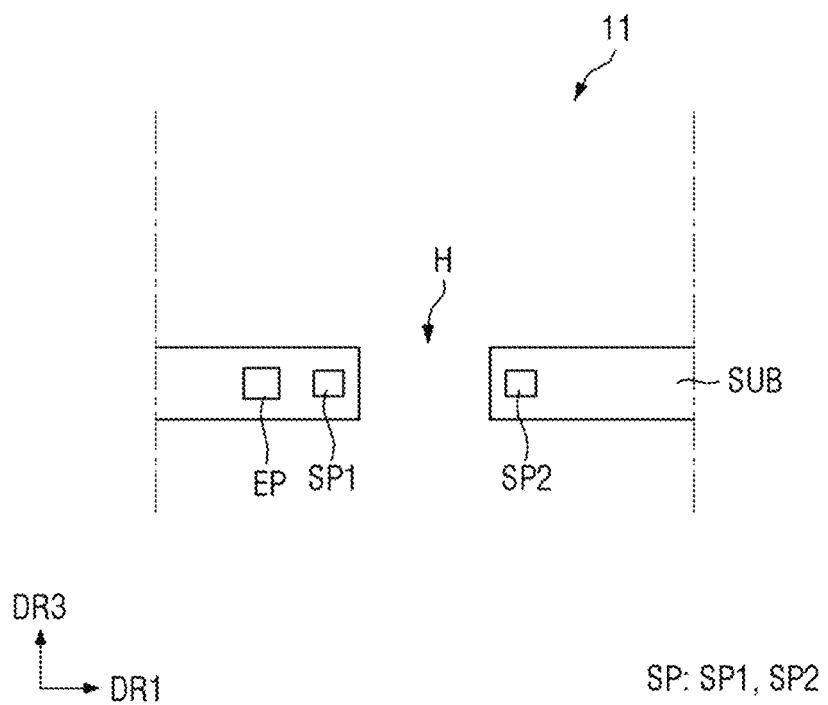
FIG. 10 is a cross-sectional view of a contactless motion device according to another embodiment of the present disclosure.

FIG. 10 is a cross-sectional view of a contactless motion device according to another embodiment of the present disclosure.

Referring to FIG. 10, a body unit 11 of the contactless motion device according to the present embodiment differs from its counterpart of FIGS. 1 through 9 in that an event unit ("50" of FIG. 1 or "EP" of FIG. 10) is inserted in a substrate SUB.

Specifically, the body unit 11 differs from its counterpart of FIGS. 1 through 9 in that an event unit ("50" of FIG. 1 or "EP" of FIG. 10) is inserted in the substrate SUB.

The event unit EP may include a vibration sensor or an acoustic sensor.

Specifically, as described above with reference to FIGS. 1 through 9, when a control unit ("30" of FIG. 1) determines (or detects) whether a target object is inserted, a signal indicating that the target object is inserted may be transmitted from the control unit to the event unit EP. When the signal indicating that the target object is inserted is transmitted from the control unit 30 to the event unit EP, the event unit EP may output an event. The event may be a vibration signal if the event unit EP is a vibration sensor, or may be a sound signal when the event unit EP is an acoustic sensor.

According to the body unit 11, the event unit ("50" of FIG. 1 or "EP" of FIG. 10) is inserted in the substrate SUB, and when the signal indicating that the target object is inserted is transmitted from the control unit 30 to the event unit EP, the event unit EP outputs an event. Accordingly, a user can receive a vibration signal or a sound signal and can thus feel a physical touch or auditory sound as if a button were actually pressed.

Figure 11:
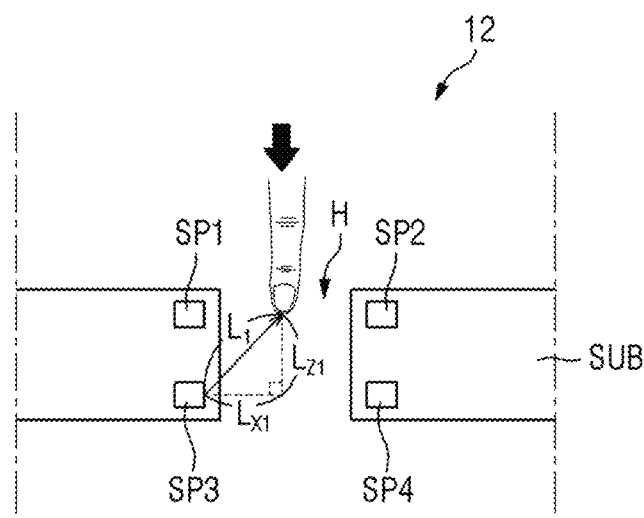
FIGS. 11 and 12 are schematic views illustrating the operation of the contactless motion device according to another embodiment of the present disclosure.
Figure 11:
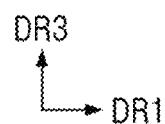
Figure 12:
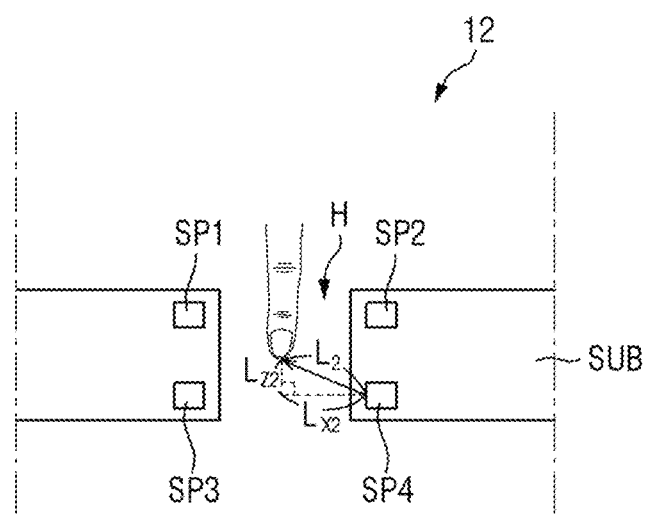

FIGS. 11 and 12 are schematic views illustrating the operation of the contactless motion device according to another embodiment of the present disclosure.

Referring to FIGS. 11 and 12, a body unit 12 of the contactless motion device according to the present embodiment differs from the body unit 10 of the contactless motion device 1 in that a sensor unit SP_1 further includes third and fourth sensors SP3 and SP4.

Specifically, the sensor unit SP_1 of the body unit 12 may further include the third and fourth sensors SP3 and SP4.

The third sensor SP3 may be positioned around a first sensor SP1, and the fourth sensor SP4 may be positioned around a second sensor SP2.

The third and fourth sensors SP3 and SP4 may transmit/receive a second signal.

The second signal may include infrared light, visible light, ultraviolet light, or ultrasound.

The third and fourth sensors SP3 and SP4 may transmit/receive the second signal to/from different locations.

For example, the third sensor SP3 may transmit the second signal to a higher location than the fourth sensor SP4 (in an upward direction in a third direction DR3) and may receive a reflection of the second signal from a target object, and the fourth sensor SP4 may transmit the second signal to a lower location than the third sensor SP3 (in a downward direction in the third direction DR3) and may receive a reflection of the second signal from the target object.

As illustrated in FIG. 11, at a first point of time, the third sensor SP3 may measure a first distance L1 from the target object by transmitting/receiving the second signal to/from the target object, may measure an angle (e.g., "A1") with the target object, and may thereby calculate a first x-axis distance Lx1 and a first z-axis distance Lz1 from the target object. The first z-axis distance Lz1 may be calculated by Equation 1 below.

$$Lz1 = L1 \sin A1 \qquad \text{[Equation 1]}$$

As illustrated in FIG. 12, at a second point of time, the fourth sensor SP4 may measure a second distance L2 from the target object by transmitting/receiving the second signal to/from the target object, may measure an angle (e.g., "A2") with the target object, and may thereby calculate a second x-axis distance Lx2 and a second z-axis distance Lz2 from the target object. The second z-axis distance Lz2 may be calculated by Equation 2 below.

$$Lz2 = L2 \sin A2 \qquad \text{[Equation 2]}$$

Then, during a period T between the second point of time and the first point of time, the difference between the second z-axis distance Lz2 and the first z-axis distance Lz1 may be calculated, thereby calculating the insertion speed of the target object.

For example, in a contactless operating method using the contactless motion device according to the present embodiment, if the insertion speed of the target object exceeds a first speed, a control unit ("30" of FIG. 1) may be configured to determine that the target object is not inserted.

Figure 13:
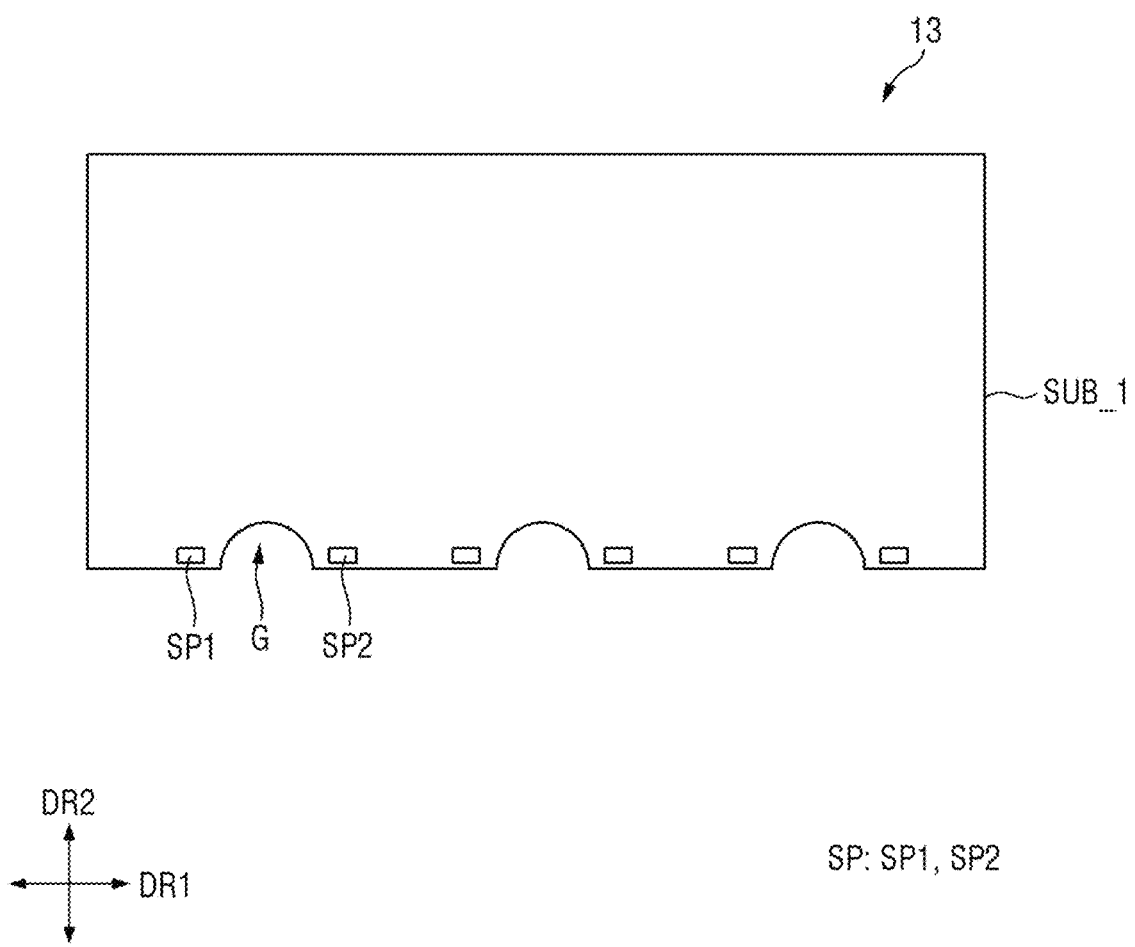
FIG. 13 is a plan view of a contactless motion device according to another embodiment of the present disclosure.

FIG. 13 is a plan view of a contactless motion device according to another embodiment of the present disclosure.

Referring to FIG. 13, a body unit 13 of the contactless motion device according to the present embodiment differs from the body unit 10 in that it further includes grooves G.

Specifically, the body unit 13 may further include at least one groove G.

The body unit 13 may include a plurality of sides. For example, the body unit 13 may have a rectangular shape in a plan view. The rectangular shape may have a plurality of sides. The body unit 13 may include long sides extending in a first direction DR1 and short sides extending in a second direction DR2.

A substrate SUB_1 of the body unit 13 may generally have a similar planar shape to, or the same planar shape as, the body unit 13.

The substrate SUB_1 of the body unit 13 may have a rectangular shape in a plan view. The rectangular shape may have a plurality of sides. The substrate SUB_1 may include long sides extending in the first direction DR1 and short sides extending in the second direction DR2.

The groove G of the substrate SUB_1 may be recessed from at least one side of the substrate SUB1. For example, the groove G of the substrate SUB_1 may be inwardly recessed from one long side of the substrate SUB1. As illustrated in FIG. 1, the groove G may be inwardly recessed from the lower long side of the substrate SUB_1.

More than one groove G may be provided. FIG. 13 illustrates that three grooves G are provided, but alternatively, one, two, or four or more grooves G may be provided.

A sensor unit SP may be positioned around the groove G.

The groove G may completely penetrate the substrate SUB_1 in a thickness direction.

The groove G may have a semicircular, semielliptical, or rectangular planar shape, but the planar shape of the groove G is not particularly limited.

When a target object is inserted in the groove G, part of a first signal L transmitted by first sensor SP1 may be blocked by the target object and may not be received by a second sensor SP2, and part of the first signal L may be able to be received by the second sensor SP2 because not being completely blocked by the target object. A control unit ("30" of FIG. 1) may determine whether the target object is inserted, by comparing the intensity of first the signal L transmitted and the intensity of the first signal L received.

The operations of the body unit 13, the control unit 30, and the event unit 50 will hereinafter be described.

When the target object is not inserted in the groove G, the first signal L received by the second sensor SP2 may have, for example, a first intensity, and when the target object is inserted in the groove G (for as long as a first period t1 of FIG. 7), the first signal L received by the second sensor SP2 may have, for example, a second intensity.

In a contactless operating method using the contactless motion device according to the present embodiment, if the second intensity is less than the first intensity by as much as a predetermined value, the control unit 30 may determine that the target object is inserted in the groove G. The second intensity may be less than the first intensity. For example, in the contactless operating method using the contactless motion device according to the present embodiment, if the second intensity is less than the first intensity by as much as a threshold value, the control unit 30 may determine that the target object is inserted in the groove G. On the contrary, in the contactless operating method using the contactless motion device according to the present embodiment, if the second intensity is greater than the first intensity by as much as the threshold value, the control unit 30 may determine that the target object is not inserted in the groove G.

Also, in the contactless operating method using the contactless motion device according to the present embodiment, if the first period t1 is more than "a" hours and less than "b" hours, the control unit 30 may determine whether the target object is inserted. In other words, if the first period t1 is less than "a" hours or more than "b" hours, the control unit 30 may determine that the target object is not inserted in the groove G.

In the contactless operating method using the contactless motion device according to the present embodiment, the control unit 30 may determine that the target object is inserted, if the first period t1 is more than "a" hours and less than "b" hours, and determine that the target object is not inserted in the groove G, if the first period t1 is less than "a" hours or more than "b" hours. Accordingly, the control unit 30 may be able not to consider input made by an unintentional action of holding the target object in the groove G as an insertion of the target object. Accordingly, the detection of an insertion of the target object by the control unit 30 can be accurately performed.

In some embodiments, in the contactless operating method using the contactless motion device according to the present embodiment, the control unit 30 may be configured to determine whether the target object is inserted, if the intensity of the first signal L received by the second sensor SP2 is repeatedly detected at least twice as being less than the intensity of the first signal L transmitted by the first sensor SP1 by as much as the threshold value.

Specifically, if the intensity of the first signal L received by the second sensor SP2 is less than the intensity of the first signal L transmitted by the first sensor SP1 by as much as the threshold value and at least two first periods t1 of more than "a" hours and less than "b" hours appear repeatedly, the control unit 30 may be configured to determine whether the target object is inserted. A second period t2 may exist between the two first periods t1.

In the contactless operating method using the contactless motion device according to the present embodiment, if the intensity of the first signal L received by the second sensor SP2 is repeatedly detected at least twice as being less than the intensity of the first signal L transmitted by the first sensor SP1 by as much as the threshold value, the control unit 30 may determine whether the target object is inserted, and the detection of an insertion of the target object by the control unit 30 can be accurately performed.

Obviously, combinations of features of each of the body units of FIGS. 10, 11, and 12 may also be applicable to the body unit 13 of FIG. 13.

Figure 14:
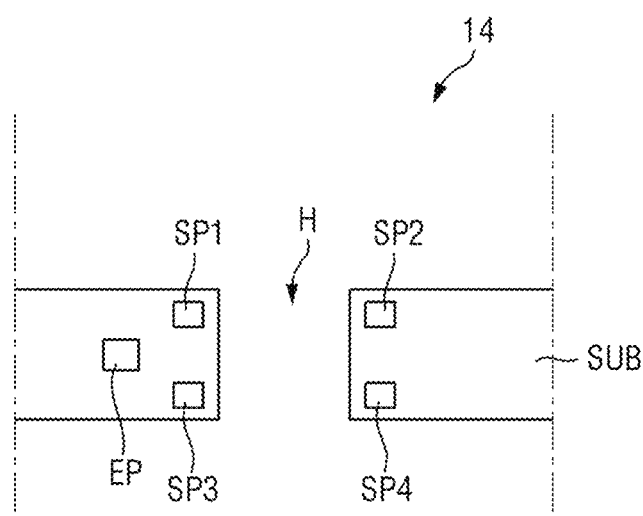
FIG. 14 is a cross-sectional view of a contactless motion device according to another embodiment of the present disclosure.

FIG. 14 is a cross-sectional view of a contactless motion device according to another embodiment of the present disclosure.

Referring to FIG. 14, a body unit 14 of the contactless motion device according to the present embodiment differs from the body unit 11 of FIG. 11 in that it further includes third and fourth sensors SP3 and SP4 of FIGS. 11 and 12.

The third and fourth sensors SP3 and SP4 are as already described above with reference to FIGS. 11 and 12, and thus, detailed descriptions thereof will be omitted. An event unit EP is as already described above with reference to FIG. 10, and thus, a detailed description thereof will be omitted.

Figure 15:
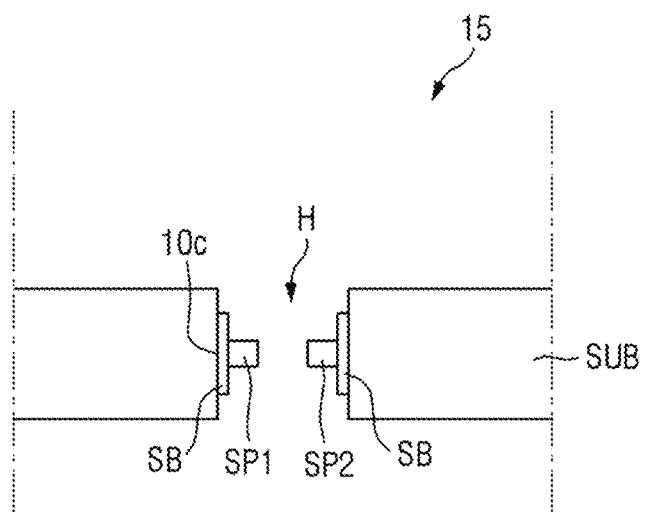
FIG. 15 is a cross-sectional view of a contactless motion device according to another embodiment of the present disclosure.

FIG. 15 is a cross-sectional view of a contactless motion device according to another embodiment of the present disclosure.

Referring to FIG. 15, a body unit 15 of the contactless motion device according to the present embodiment differs from the body unit 10 of FIGS. 1 through 9 in that it further includes sub-units SB.

Specifically, the body unit 15 may further include the sub-unit SB.

The sub-units SB may be disposed in a hole H. The sub-units SB may be disposed on side surfaces 10c of a substrate SUB. More than one sub-unit SB may be provided. A sensor unit (SP1 and SP2) may be mounted on the sub-units SB.

According to the body unit 15, as the sensor unit (SP1 and SP2) is mounted on the sub-units SB, the replacement of the sensor unit (SP1 and SP2) can be facilitated.

Figure 16:
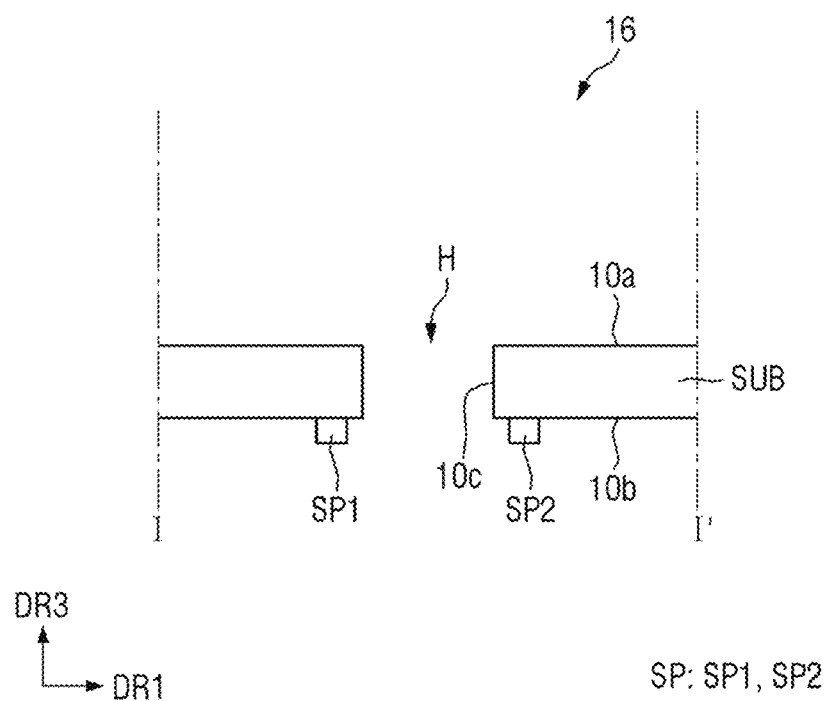
FIG. 16 is a cross-sectional view of a contactless motion device according to another embodiment of the present disclosure.

FIG. 16 is a cross-sectional view of a contactless motion device according to another embodiment of the present disclosure.

Referring to FIG. 16, a body unit 16 of the contactless motion device according to the present embodiment differs from the body unit 10 of FIG. 3 in that a sensor unit SP (SP1 and SP2) is disposed on a bottom surface 10b of a substrate SUB. Other features of the body unit 16 are as already described above with reference to FIG. 3, and thus, detailed descriptions thereof will be omitted.

Figure 17:
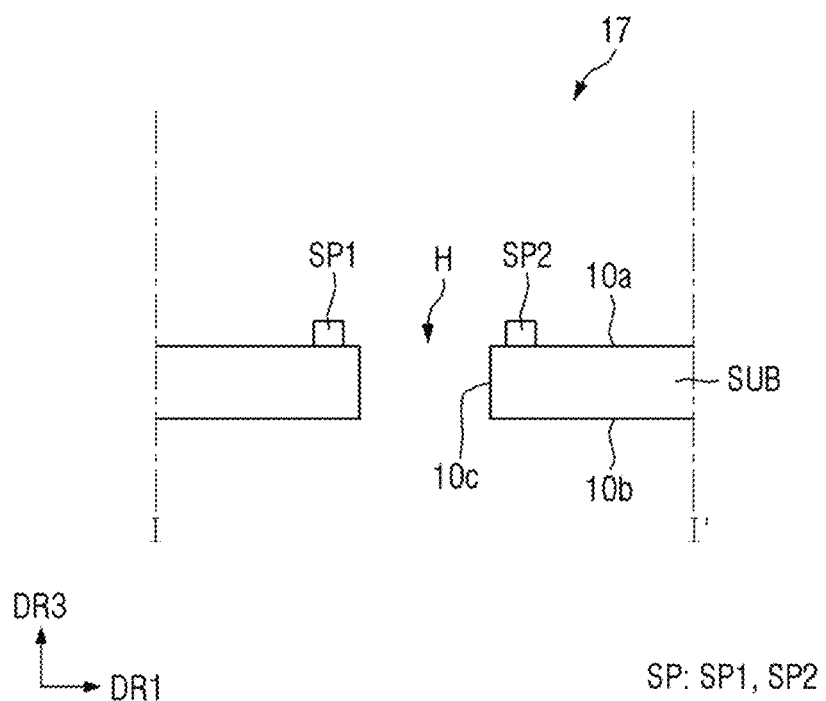
FIG. 17 is a cross-sectional view of a contactless motion device according to another embodiment of the present disclosure.

FIG. 17 is a cross-sectional view of a contactless motion device according to another embodiment of the present disclosure.

Referring to FIG. 17, a body unit 17 of the contactless motion device according to the present embodiment differs from the body unit 10 of FIG. 3 in that a sensor unit SP (SP1 and SP2) is disposed on a top surface 10a of a substrate SUB. Other features of the body unit 17 are as already described above with reference to FIG. 3, and thus, detailed descriptions thereof will be omitted.

Figure 18:
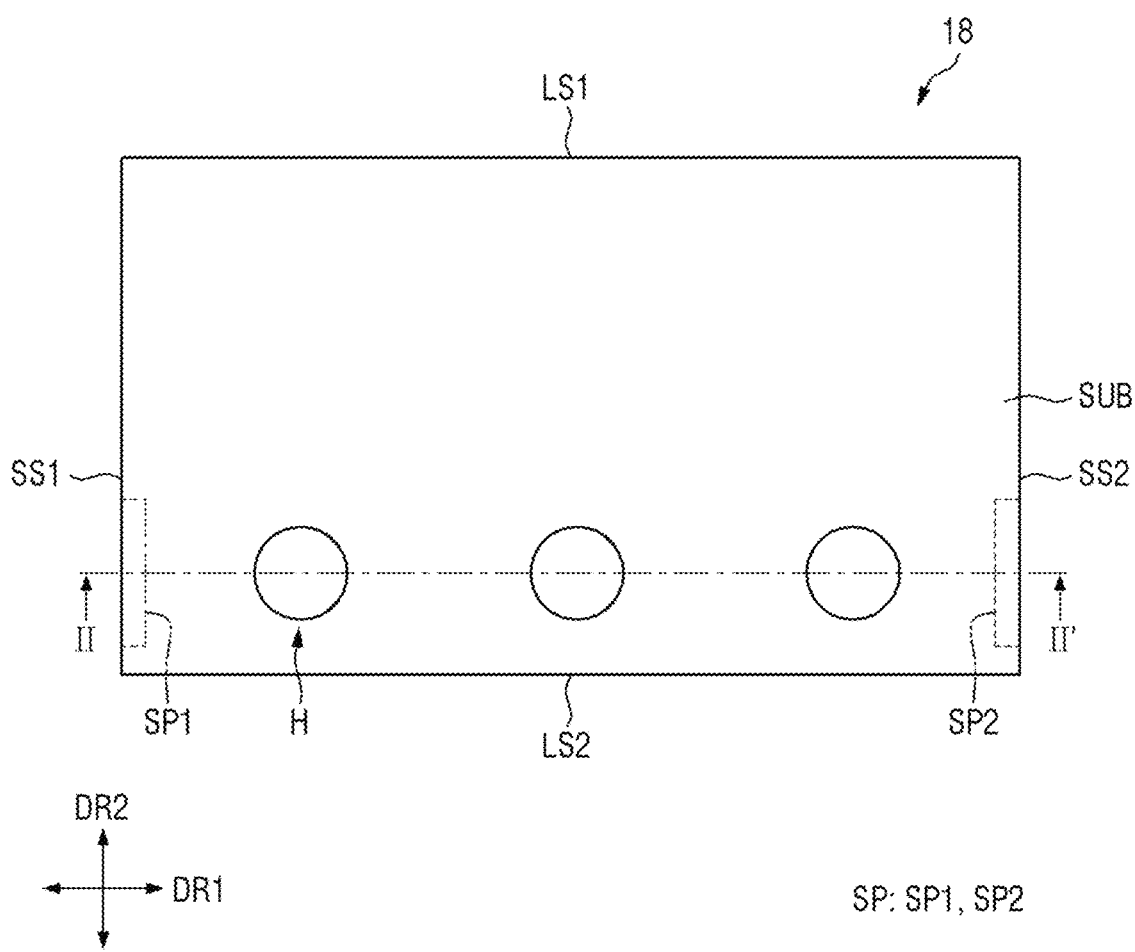
FIG. 18 is a cross-sectional view of a contactless motion device according to another embodiment of the present disclosure.
Figure 19:
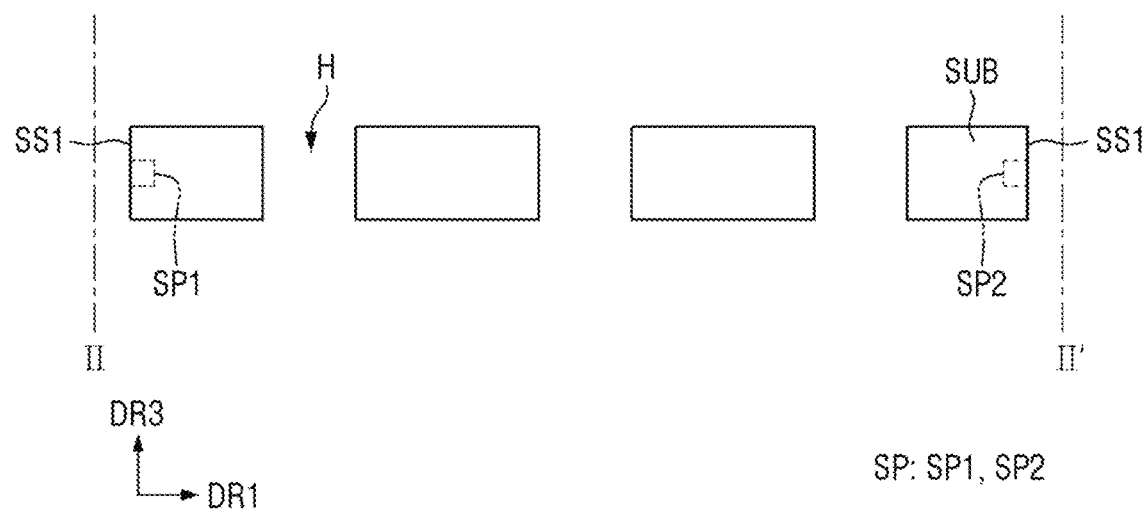
FIG. 19 is a cross-sectional view taken along line II-II' of FIG. 18.

FIG. 18 is a cross-sectional view of a contactless motion device according to another embodiment of the present disclosure. FIG. 19 is a cross-sectional view taken along line II-II' of FIG. 18.

Referring to FIGS. 18 and 19, a body unit 18 of the contactless motion device according to the present embodiment differs from the body unit 10 in that a sensor unit SP (SP1 and SP2) is disposed adjacent to short sides (SS1 and SS2) of a substrate SUB.

Specifically, the sensor unit SP (SP1 and SP2) may be disposed adjacent to the short sides (SS1 and SS2) of the substrate SUB. For example, a first sensor SP1 may be positioned on one side, in a first direction DR1, of an array of a plurality of holes H that are arranged in the first direction DR1, and a second sensor SP2 may be positioned on the other (opposite) side, in the first direction DR1, of the array of the holes H.

Functions of the first and second sensors SP1 and SP2 are as already described above, and thus, detailed descriptions thereof will be omitted.

In some embodiments, the sensor unit (SP1 and SP2) may not be inserted in the substrate SUB, but may be disposed on a top surface or a bottom surface 10a or 10b of the substrate SUB, as illustrated in FIGS. 16 and 17.

Figure 20:
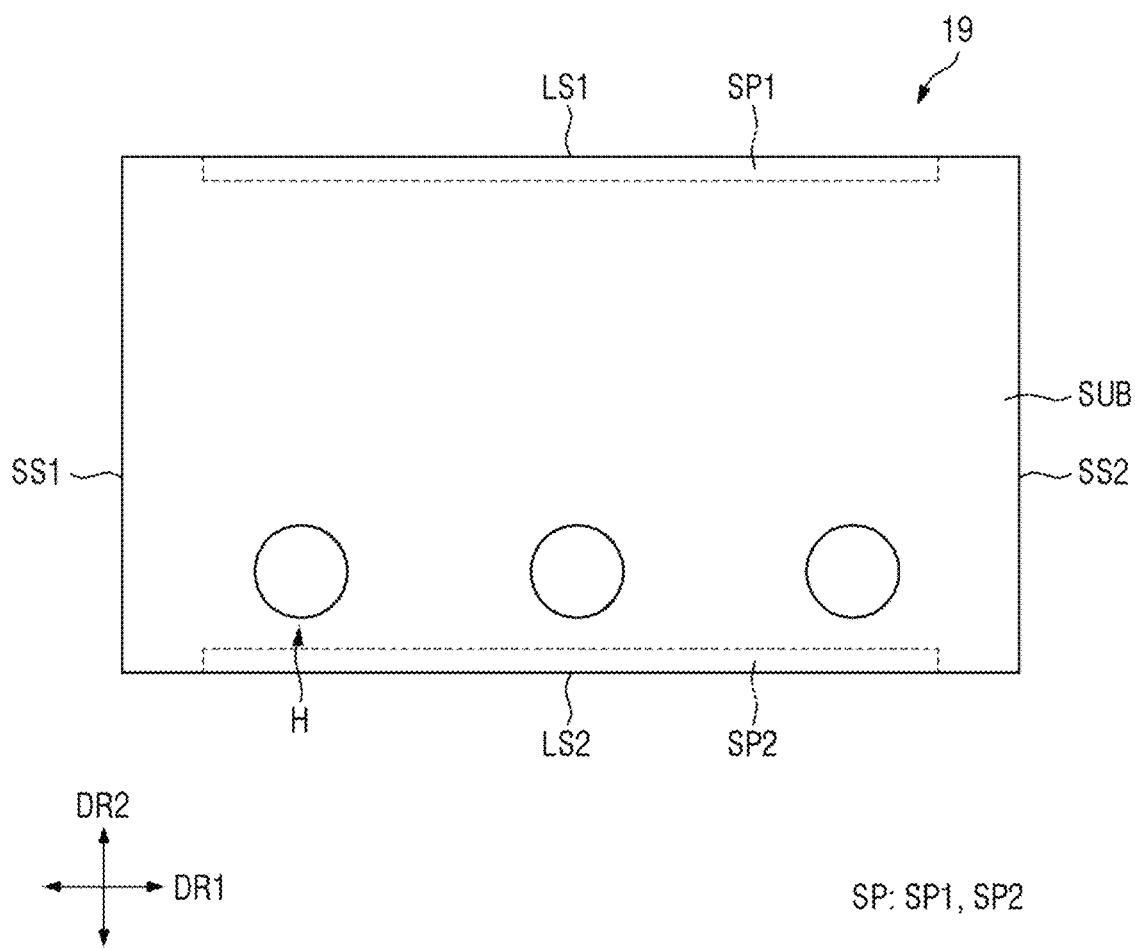
FIG. 20 is a plan view of a contactless motion device according to another embodiment of the present disclosure.

FIG. 20 is a plan view of a contactless motion device according to another embodiment of the present disclosure.

Referring to FIG. 20, a body unit 19 of the contactless motion device according to the present embodiment differs from the body unit 10 of FIG. 3 in that a sensor unit SP (SP1 and SP2) is disposed adjacent to long sides (LS1 and LS2) of a substrate SUB.

Specifically, the sensor unit SP (SP1 and SP2) of the body unit 19 may be disposed adjacent to the long sides (LS1 and LS2) of the substrate SUB.

For example, a first sensor SP1 may be disposed adjacent to a first long sides LS1, and the second sensor SP2 may be disposed adjacent to a second long side LS2. The length, in a first direction DR1, of the sensor unit (SP1 and SP2) may be greater than the distance from a first end of a hole H on one side, in the first direction DR1, of the first long side LS1 to a second end of a hole H on the other side, in the first direction DR1, of the first long side LS1.

Other features of the body unit 19 are as already described above with reference to FIG. 3, and thus, detailed descriptions thereof will be omitted.

Figure 21:
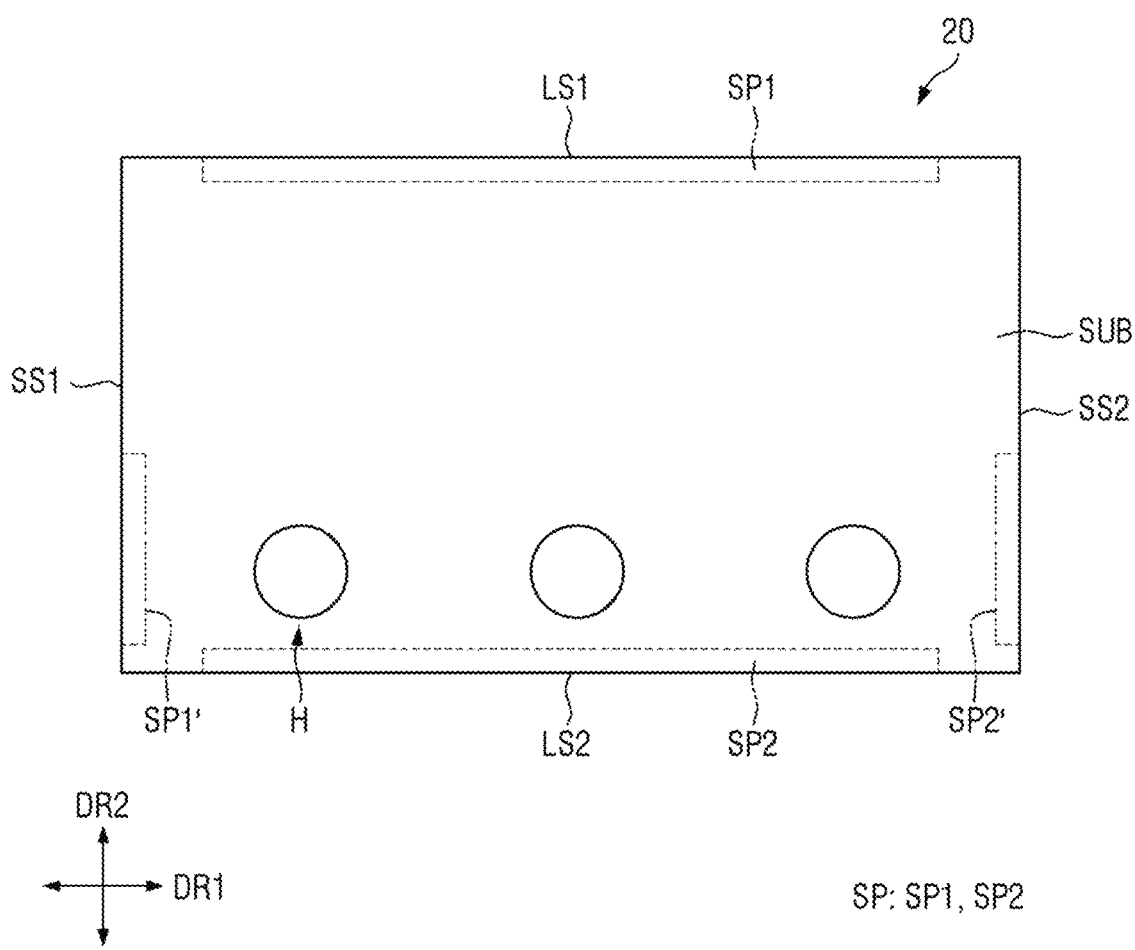
FIG. 21 is a plan view of a contactless motion device according to another embodiment of the present disclosure.

FIG. 21 is a plan view of a contactless motion device according to another embodiment of the present disclosure.

Referring to FIG. 21, a body unit 20 of the contactless motion device according to the present embodiment differs from the body unit 18 of FIG. 18 in that it includes both the sensor unit (SP1 and SP2) of FIG. 18 and the sensor unit (SP1 and SP2) of FIG. 19.

Other features of the body unit 20 are as already described above with reference to FIGS. 18 and 19, and thus, detailed descriptions thereof will be omitted.

Embodiments of the present invention have been described with reference to the accompanying drawings, but it will be understood by those of skill in the art that various changes in form and details may be made without departing from the spirit and scope of the present invention as set forth in the following claims. Therefore, it should be construed that the exemplary embodiments described above are exemplary in all respects and are not limiting.

What is claimed is:

1. A contactless motion device comprising:
   a substrate including at least one hole;
   a body unit including a sensor unit, which is disposed around the hole in a plan view; and
   a control unit connected to the sensor unit,
   wherein
   the sensor unit includes a first sensor, which transmits a first signal, and a second sensor, which receives the first signal,
   the control unit is configured to determine whether a target object is inserted in the hole, based on the first signal received by the second sensor, and
   the hole completely penetrates the substrate in a thickness direction, and
   wherein the control unit is configured to determine whether the target object is inserted in the hole, if an intensity of the first signal received by the second sensor is repeatedly detected at least twice as being less than an intensity of the first signal transmitted by the first sensor by as much as a threshold value.

2. The contactless motion device of claim 1, wherein the first and second sensors are inserted in the substrate.

3. The contactless motion device of claim 1, wherein the control unit is configured to determine whether the target object is inserted in the hole, if an intensity of the first signal received by the second sensor is less than an intensity of the first signal transmitted by the first sensor by as much as a threshold value.

4. The contactless motion device of claim 3, wherein the control unit is configured to determine whether the target object is inserted in the hole, if a duration for which the intensity of the first signal received by the second sensor continues to be less than the intensity of the first signal transmitted by the first sensor by as much as the threshold value is longer than a first period and a shorter than a second period.

5. The contactless motion device of claim 1, further comprising:
   an event unit connected to the control unit,
   wherein the event unit is configured to output an event, if the control unit detects whether the target object is inserted, and includes a vibration sensor or an acoustic sensor.

6. The contactless motion device of claim 1, wherein
   the sensor unit further includes third and fourth sensors,
   the third and fourth sensors are configured to measure an insertion speed of the target object by measuring a distance from the target object at first and second points, respectively, of time, the second point of time is later than the first point of time, and the control unit determines that the target object is not inserted, if the insertion speed of the target object is greater than a first speed.

7. The contactless motion device of claim 1, wherein the first signal includes infrared light, visible light, or ultrasound.

8. The contactless motion device of claim 1, further comprising:

sub-units disposed in the hole to be spaced apart from each other, wherein the first and second sensors are mounted on the sub-units.

9. The contactless motion device of claim 1, wherein a plurality of holes are provided, the first sensor is positioned on one side of an array of the plurality of holes, and the second sensor is positioned on the other opposite side of the array of the plurality of holes.

10. The contactless motion device of claim 1, wherein a plurality of holes are provided, the plurality of holes are arranged in a first direction, the first sensor is positioned on one side, in a second direction, which intersects the first direction, of an array of the plurality of holes, and the second sensor is positioned on the other side, in the second direction, of the array of the plurality of holes.

11. A contactless motion device comprising:

a substrate including a plurality of sides and a groove, which is recessed from at least one of the sides;

a body unit including a sensor unit, which is disposed around the groove in a plan view;

a control unit connected to the sensor unit, wherein the sensor unit includes a first sensor, which transmits a first signal, and a second sensor, which receives the first signal, and the control unit is configured to determine whether a target object is inserted in the groove, based on the first signal received by the second sensor, and wherein the sensor unit further includes third and fourth sensors, the third and fourth sensors are configured to measure an insertion speed of the target object by measuring a distance from the target object at first and second points, respectively, of time, the second point of time is later than the first point of time, and the control unit determines that the target object is not inserted, if the insertion speed of the target object is greater than a first speed.

12. The contactless motion device of claim 11, wherein the groove completely penetrates the substrate in a thickness direction.

13. The contactless motion device of claim 11, wherein the first and second sensors are inserted in the substrate.

14. The contactless motion device of claim 11, wherein the control unit is configured to determine whether the target object is inserted in the groove, if an intensity of the first signal received by the second sensor is less than an intensity of the first signal transmitted by the first sensor by as much as a threshold value.

15. The contactless motion device of claim 14, wherein the control unit is configured to determine whether the target object is inserted in the hole, if a duration for which the intensity of the first signal received by the second sensor continues to be less than the intensity of the first signal transmitted by the first sensor by as much as the threshold value is longer than a first period and a shorter than a second period.

16. The contactless motion device of claim 11, wherein the control unit is configured to determine whether the target object is inserted in the hole, if an intensity of the first signal received by the second sensor is repeatedly detected at least twice as being less than an intensity of the first signal transmitted by the first sensor by as much as a threshold value.

17. The contactless motion device of claim 11, further comprising:

an event unit connected to the control unit, wherein the event unit is configured to output an event, if the control unit detects whether the target object is inserted.

18. The contactless motion device of claim 12, further comprising:

sub-units disposed in the hole to be spaced apart from each other, wherein the first and second sensors are mounted on the sub-units.

* * * * *